W. E. AMBERG.
DETACHABLE LINK BELT.
APPLICATION FILED DEC. 6, 1917.
1,313,871.
Patented Aug. 26, 1919.
2 SHEETS—SHEET 2.
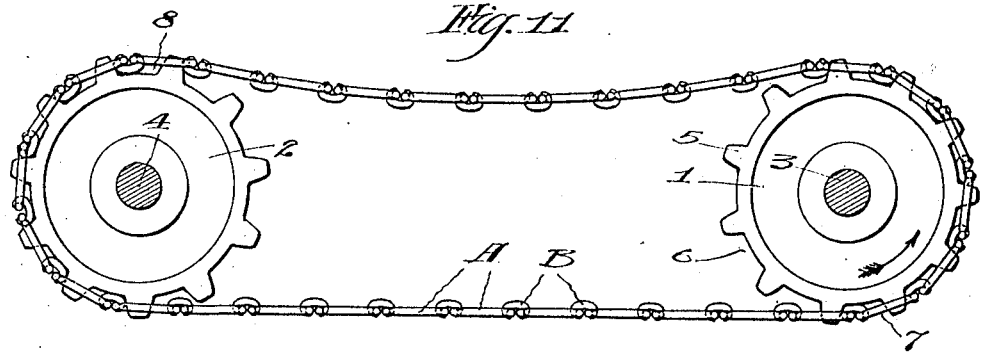
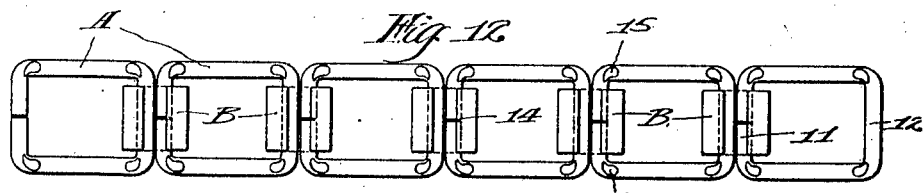
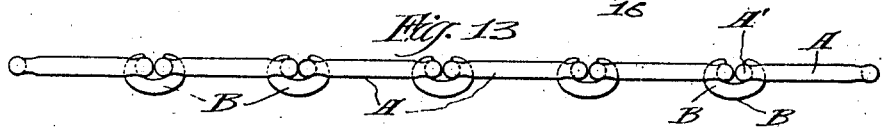
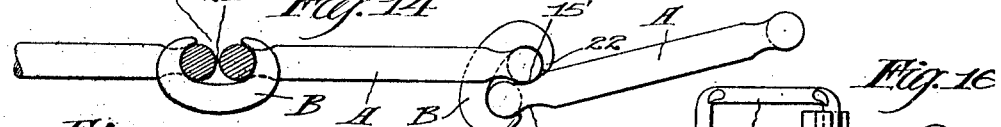
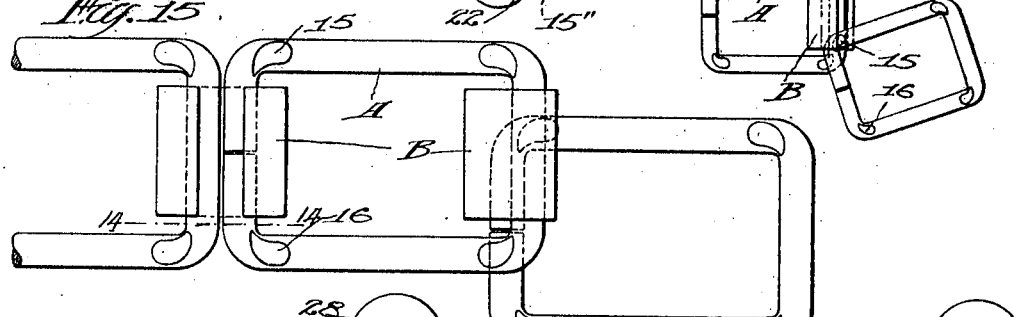
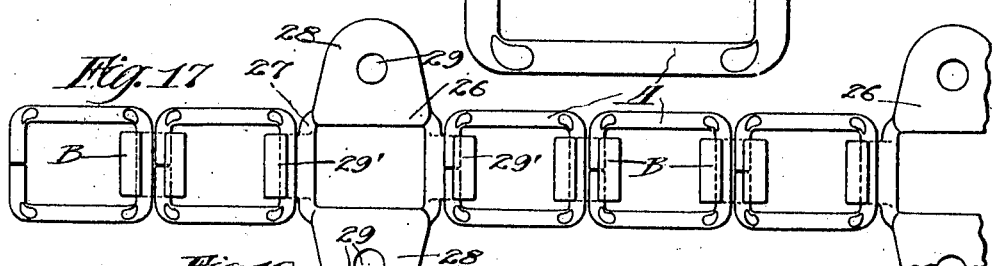
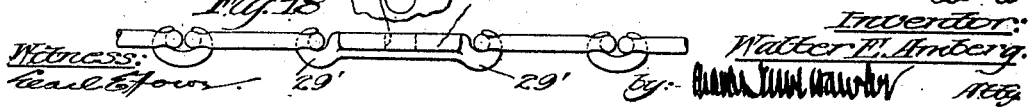

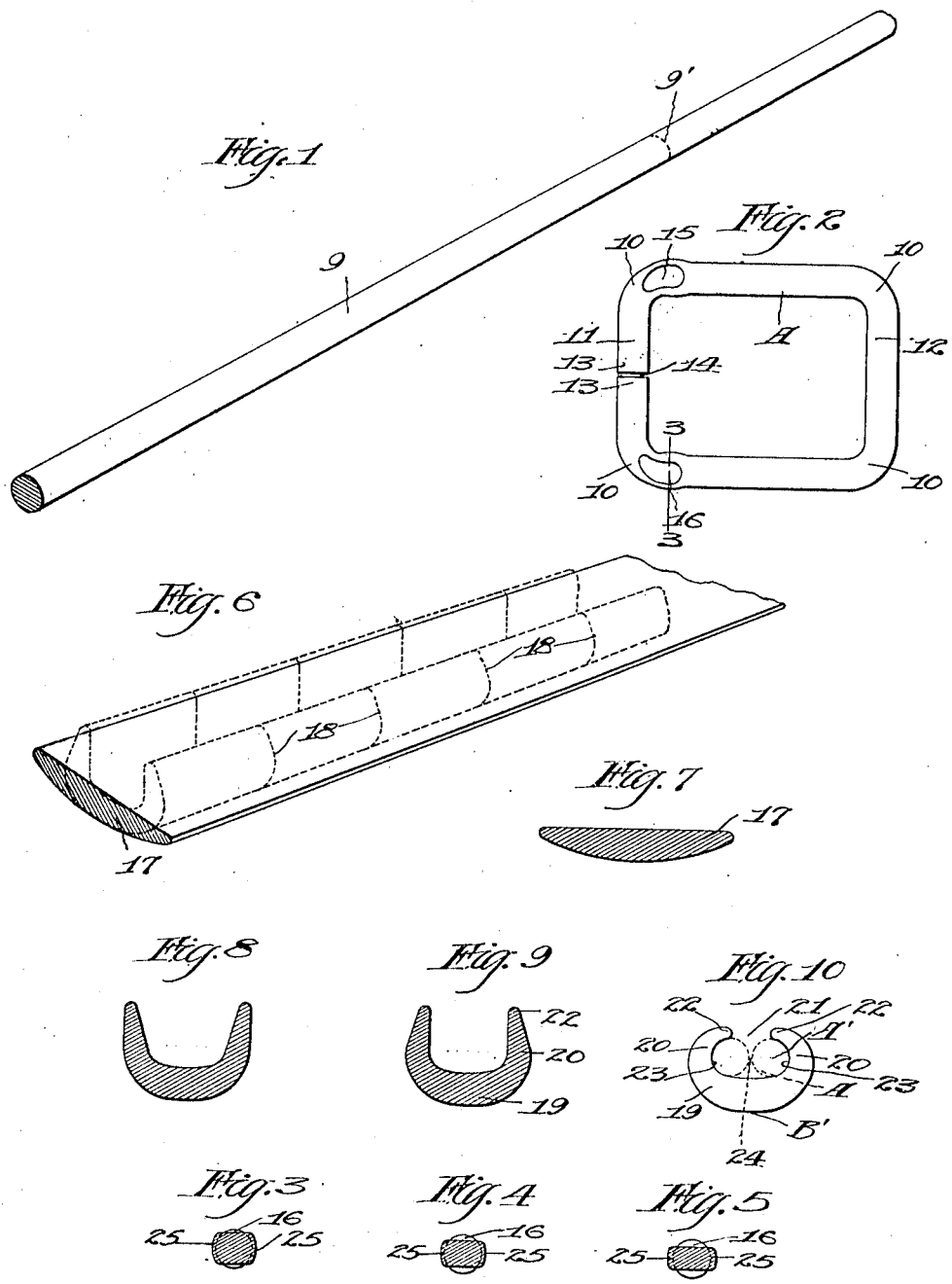

UNITED STATES PATENT OFFICE.

WALTER E. AMBERG, OF CHICAGO, ILLINOIS, ASSIGNOR TO AMBERG STEEL COMPANY, OF CHICAGO, ILLINOIS, A CORPORATION OF ILLINOIS.

DETACHABLE LINK BELT.

1,313,871.     Specification of Letters Patent.     Patented Aug. 26, 1919.

Application filed December 6, 1917. Serial No. 205,792.

*To all whom it may concern:*

Be it known that I, WALTER E. AMBERG, a citizen of the United States, and a resident of Chicago, Cook county, Illinois, have invented a new, useful, and improved article of manufacture, the same being the Detachable Link Belt, of which the following is a specification.

My invention has to do with metallic driving belts of the type composed of rectangular, slidably detachable links, and used upon complementary sprocket wheels, the latter being mounted upon respective shafts.

The invention is a complete substitute for the well-known single-piece-link belts and chains, both malleable and stamped, which are now extensively used in conjunction with such sprocket wheels; but the invention does not involve a substitution of the sprockets or sprocket wheels, nor any change in the now firmly established proportions and designs thereof.

It is generally recognized that sprocket wheels have fully proven their correctness and worth in thousands of different situations and in a great variety of machines, and that they are designed upon the right principle; so much so, that any attempt to change them would involve a departure from a long accepted standard, and would occasion incalculable confusion in many industries. Hence I do not propose to change the sprocket wheels in any manner. Instead, I adapt my invention to the already adopted sprocket wheel designs, so that the latter may continue in use and go forward to larger uses without change in either old or new machinery.

On the other hand, it has long been appreciated that the present detachable link chains and belts are not truly or desirably the equal complements of the sprocket wheels wherewith they are used; lacking many qualities that they should possess to make them work as effectively and wear as long as the sprocket wheels.

The primary object of my invention is to provide a detachable link belt or chain which shall be this much desired mechanical equal or true complement of the standard sprocket wheel, in the matter of cost, weight, strength, durability, reliability, and general adaptability.

The sprocket wheel being a symmetrical device, may be used, that is rotated, in either direction. This is not true of any single-piece-link detachable belt, for the direction of movement of such a belt is of special moment; inasmuch as if worked in wrong directions such belts quickly wear out; and not only themselves wear rapidly, but also wear out the sprocket wheels.

A further object of my invention is to provide a detachable link belt or chain which shall be adapted to run in either direction without more wear or resistance in the one than in the other direction, so that it shall not be necessary to use special knowledge or skill in placing the belt upon the sprocket wheels; and, furthermore, so that these sprocket belts may be used in reversing mechanisms of various kinds.

These objects are not individual to myself but have been commonly entertained in the art; and it is safe to say that it has been found impossible to attain them in any link belt or chain which is made up of cast metal links, or through any simulation thereof in sheet metal,—for on the one hand all single-piece links of necessity are of the single-direction variety; and on the other hand, composite slidably detachable links cannot be made of these materials without necessitating modifications in the sprocket wheels, to compensate for the stretching of the links and for the bulkiness of the parts or portions which connect the links proper.

Realizing these facts, my invention proceeds upon the basis of two main conceptions, to-wit, the necessity for discarding materials hitherto used in the manufacture of link belts and chains for standard sprockets, and the finding of a material or materials better suited to the solution of the problems stated above; and, second, the forming of this new material in new ways and in new shapes to make a true substitute for the present link belts without necessitating changes in the sprocket wheels complementary thereto, and to the end that the new links may perform important functions not now performed by chain belts, and for the avoidance of the difficulties which have been experienced in both manufacture and use of detachable-link belts.

Proceeding on the basis of these conceptions, I adapt or select wire stock (called rod stock in the larger sizes) as the material from which to make the parts of my detachable link belt; to the end that the many fine attributes of wire, to-wit, its relative cheapness;—its comparatively great tensile strength;—its susceptibility to temper, and the hardening of its surface;—the great range of alloy steels which are commercially available only in this wire or rod form;—its smooth, hard surface;—its adaptability;—its strength;—uniformity of cross-section;—its longitudinal grain;—its light weight and bulk in proportion to its strength;—its capacity to be fabricated into desired shapes without waste;—and the ease with which it can be worked, all may be utilized to produce an inexpensive and very superior article of manufacture, within the limitations and dimensions imposed by and incident to standard sprocket wheels and the stretching of the links in service.

Thus my invention comprises a link belt or chain (suitable for standard sprocket wheels) preferably of the slidably detachable type, and which is made of wire.

More explicitly stated, my invention is a new article of manufacture comprising in its preferred form a detachable link belt or chain for use on sprockets designed for single-piece-link belts or chains, and composed of parts or links of only two forms, both made of wire; the first links being substantially rectangular, presenting straight, but cross-sectionally round, pintle portions, and rounded corners, and in the best form having a thin assembly neck at at least one corner (preferably formed by crushing the wire at that point); and the links of the second form being semi-rollers or rocker elements, crescent-like in shape, of a depth corresponding to the pitch depth of the complementary sprocket wheel, and in each case pivotally containing two pintles of adjacent links in intimate but preferably non-contacting relation and thus serving as a coupler for said links, and the links of the two forms being assembled by co-action with the assembly necks of the first links and the crescent ends of the second links; and said second links or couplers having, after assembly, only a limited longitudinal play upon respective coupled pintles, being centered or restrained by the rounded corner portions of the connected links.

As stated, I prefer that the assembly necks of the rectangular links shall be formed by crushing and laterally distending the wire at the corner or corners of the link, my purpose being thereby to harden the metal in the neck and better to dispose the displaced metal for the resistance of bending forces at the corners of the link.

The invention will readily be understood on reference to the drawings which form part of this specification and which illustrate my invention in the form which I now deem best.

Figure 1 of the drawings, is a perspective view of a short length of the wire stock from which I make the above mentioned links of the first form, to-wit, those links which receive the sprocket teeth;—Fig. 2 shows one of the links of the first form in its completed condition;—Figs. 3, 4, and 5 are sectional details as upon the line 3—3 of Fig. 2, showing assembly necks of different thicknesses produced by different degrees of crushing and distending the metal at those points;—Fig. 6 is a perspective view of a short length of the flat wire stock (the dotted lines show it partly shaped) from which I make the above mentioned links of the second form, to-wit, the semi-roller couplers, which connect the links of the first form;—Fig. 7 is a cross-section of the flat wire stock from which the couplers are made;—Figs. 8, 9, and 10 are sectional views illustrating three stages in the shaping or forming of the coupler from the flat wire stock;—Fig. 11 illustrates my belt or chain in operative position upon spaced sprocket wheels;—Fig. 12 is a plan or face view of a section (a plurality of coupled links) of my complete detachable link belt; Fig. 13 is an edge-view thereof;— Fig. 14 is an enlarged edge-view, showing one pair of links in section, as upon the line 14—14 of Fig. 15, and another pair of links in the act of assembly; Fig. 15 is a plan view taken from Fig. 14;—Fig. 16 is a diagrammatic detail illustrating the ease with which a link of the first form is entered in the coupler; Fig. 17 is like unto Fig. 13, but shows an interpolated special link adapted for the attachment of the cross-bar of a conveyer or the like;—and Fig. 18 is an edge view taken from Fig. 17.

Referring first to Fig. 11 of the drawings:—1 and 2 represent standard sprocket wheels, upon their respective shafts, 3 and 4. The teeth, 5, and the lands or spaces, 6, between the teeth and the pitch depth of the teeth are laid out upon the principle or design which controls the form of all standard sprocket wheels, as above mentioned. The sprocket wheels are here shown in their initial or ideal starting condition; this is true also of the link belt shown thereon; no account being taken of the stretching of the belt or of the wear upon the sprocket teeth, both of which result from use; and both of which are provided for in the design of standard sprocket wheels.

My novel sprocket belt comprises links, A, and couplers, B, respectively of the first and second forms above mentioned. Hereinafter the parts, A, will be referred to merely as links, and the parts, B, will be termed couplers. As shown, the links, A, are open rectangles and receive the teeth of the sprocket wheels. The couplers directly engage and co-act with those teeth.

Reverting to the matter of the stretching of the belt in use and to the wearing away of the sprocket teeth,—it is sufficient to note that the couplers, B, in every case are of much less width (considered longitudinally of the chain) than the gaps or lands, 6, between the sprocket teeth, 5, so that there is always a relatively large space between each coupler and the sprocket tooth next adjacent to it, across the gap which contains the coupler. In other words, in the case of the driving sprocket, 1, there remains a wide gap, 7, between each coupler and the back of the sprocket tooth next in advance of it; and in the case of the driven sprocket, 2, there remains a space, 8, between each coupler and the tooth which next follows it. The allowance of this space makes it possible for the chain to stretch and for the sprocket teeth and lands to wear without causing the belt to "climb" upon the teeth of either sprocket wheel. In every case the gap, space or play between the couplers and the sprocket teeth is fully adequate to compensate for every lack of uniformity in the sprockets and for all normal stretch and wear; and this is particularly true because my sprocket belt possesses the comparatively non-stretchable characteristics of the wire stock from which its links are formed.

At this point I again direct attention to the fact that the wire stock may be of any desired hardness, toughness, and temper, according to the service to be performed by the belt or chain. Obviously, also the belt takes on the character of any alloy metal wire stock that may be selected, of which a wide variety is available in the open market. I desire also that it shall be understood that after the links and couplers are formed, they may be case-hardened; a measure that I particularly recommend as to the semi-roller couplers; and in case of the links, where cheaper non-stretchable and wear-resisting links are desired.

As more fully explained hereinafter, the couplers, B, have a semi-rolling or rocker manner of coacting with the teeth of the sprocket wheels, and the action of the couplers is identically the same with respect to both driving and driven sprocket wheels; wherefore, it follows that the belt being symmetrical in this respect, it may be driven in either direction regardless of the positions of the sprocket wheels, the relations thereof, or the use to which the belt is put; incidentally thus opening the field for the use of these sprocket belts in driving and reversing mechanisms.

The ordinary sprocket being composed of a series of identical links is commonly referred to as a one-piece detachable sprocket or link belt. In contrast, my new article may be termed a "two-piece" sprocket or link belt, being composed of links of two kinds. An important incident or result of this construction resides in the fact that each end of each rectangular link, A, is provided with identically the same kind of coupler connection, and therefore when the belt is flexed in passing around a sprocket wheel every main link, A, pulls freely at both ends and thus the couplers are relieved from forces and thrusts which otherwise would tend to move them radially with respect to the sprocket teeth. In other words, by my invention I eliminate the destructive radial play or action which is such a marked detriment in the case of the ordinary or single-piece link belting.

The rules to be followed in the selection of wire stock are as follows: The wire from which the links, A, are to be made should be of a cross-section sufficient to afford the tensile strength required of the chain, with the usual factor of safety. Obviously, this cross-section will vary with the character of the metal composing the wire. Similarly, the cross-section of the wire stock for the couplers, B, will vary with the character of the metal composing the stock. Second, the coupler stock must be of sufficient width to embrace (in the manner hereinafter explained) the pintles of two links. Third, the stock must be of sufficient depth or thickness to provide the proper pitch for the chain or belt; that is, in each case, the distance between the link centers, A', and the bottom, B', of the coupler, equals (as nearly as possible) the pitch depth of the sprocket teeth whereon the chain is to be used. In this simple way I establish the essential coincidence of pitch between the sprocket wheels and the sprocket belt.

Using the wire stock, 9, depicted in Fig. 1, for the manufacture of the links, A, the wire is taken from an ordinary reel and is cut into lengths, as indicated by the dotted line, 9', to form successive links, A. Each portion of wire is bent into the rectangular form shown in Fig. 2, preserving its circular cross section throughout. This circular section, either coincidentally or later, is locally modified by the forming of the assembly necks, as hereinafter explained.

It is to be noted that each link is formed with four rounded corners, 10; that is, the wire is merely bent; and sharp corners are avoided. I avoid sharp corners for several reasons. First, because the rounded corners serve to give the link considerable resilience; this aids in the absorption of shocks and adds resistance to shearing strains; second, the avoidance of sharp corners makes it easier to assemble the links with their couplers, as hereinafter explained; third, it is the most economical of constructions; fourth, it yields a safety characteristic for the link belt as a whole, as hereinafter explained in detail; fifth, the internal corner bends have a beneficial co-action with the couplers in the matter of keeping the latter centered upon the pintles.

The pintles mentioned are the cross-sectionally circular ends, 11 and 12, of the link; which because of the initial surface finish of the wire and the longitudinal grain thereof, are admirably suited to resist wear.

The length and breadth of the link, A, are determined by the dimensions of the sprocket wheels wherewith the belt is to be used.

In shaping the wire into the rectangular form depicted, the ends 13—13 are brought close together. They may be firmly abutted together, if desired, by giving the link an initially inward set or resilience; or, if desired for work of special character, the ends, 13—13, may be butt-welded, or otherwise permanently joined or united. However, the link which presents the open crack 14 is the usual form, for such links are fully adequate as substitutes for the old links, in matter of tensile strength; particularly as the open link (containing the opening or crack 14) is further improved by the strengthening of the link corners, which I accomplish by crushing the wire to form the thin assembly necks, as hereinafter described.

In Fig. 2, the assembly necks are indicated at 15 and 16, adjacent the pintle, 11, which contains the opening, 14. Other figures of the drawings show an assembly neck at each corner of the link, A. The advantage of the latter construction is that such links may be assembled without selection of either end or corner with respect to the coupler. A neck formed at a single corner of the link would be sufficient to permit attachment and detachment, but it is desirable that in every case there shall be two necks at one end of the link to avoid a right and left hand complication.

In manufacturing the couplers, B, the wire stock 17 shown in Figs. 6 and 7 may likewise be taken from an ordinary reel and progressively formed to the several conditions depicted in Figs. 6, 8, and 9; and thereafter progressively severed, as upon the dotted lines, 18 (Fig. 6), the length of each severed section being the finished length of the coupler. Special advantages attach to the preservation of the longitudinal grain and the surface finish of the couplers made from this wire stock, both of these features having an important bearing upon the strength and wearing qualities of the coupler. A completed, crescent-like coupler, B, comprises a body portion, 19, presenting the curved bottom, B′, before referred to, and the abruptly up-turned end portions, 20. The space, 21, between the crescent ends, 22, will be referred to as the throat of the coupler. Underlying this throat is the open groove or space defined by the curved wall, 23, which latter forms the seat for the two pintles of adjacent links, A. The end portions of the wall or seat, 23, are of a curvature corresponding closely to the cross-sectional curvature of the pintles mentioned. The distance between the ends of the seat, 23, is slightly greater than the sum of the diameters of the two pintles embraced by the coupler, to the end that the pintles may be held without actual contact between them, as best illustrated by the somewhat exaggerated opening, 24, indicated in Fig. 14. No particular play is permitted between the pintles, yet they are not permitted to grind together; hence each pintle is left to pivot freely in the coupler. The throat, 21, of the coupler has a definite dimension which is determined by the diameter of the link stock, 9, and the thickness of the assembly necks of the link, A, used with the coupler, as presently explained.

A distinct advantage of my structure is that the couplers may be shaped to the form illustrated in Fig. 10 in the process of initially assembling the links of a belt, and whether so initially shaped and joined to the links, A, or whether separately shaped and assembled, the couplers may at all times easily be attached and detached from the links, A.

In the ordinary assembling of the parts, a coupler is first placed on the pintle of one link and the coupler is then swung downwardly to the position illustrated in Figs. 14 and 15, in which position it readily receives the coacting pintle of the second link, the latter sliding into place laterally with respect to the coupler. At such time the already placed pintle is accommodated in one neck depression and the crescent end of the coupler is accommodated in the opposite neck depression. This assembling operation is further facilitated by the rounded corner bend of the link, as clearly shown in Fig. 16, the rounded corner making it possible to enter the second link in the coupler without necessitating a true parallel alinement of the two links, A. Fig. 16 is inverted with respect to Figs. 14 and 15, for clarity of illustration. Thus the assembling operation continues from link to link.

A special advantage is to be noted in the fact that the last link and coupler that are joined in the act of placing the belt upon the sprocket wheels, may be connected with less than the usual slack in the belt. The small amount of necessary slack, as shown in Fig. 14, is less than the width of a single coupler; as against the full link length of slack required for the assemblage of a one-piece link belt.

A further advantage of the rounded corner links clearly appears in the drawings, to-wit, the couplers are held remote from the side bars of the link and hence from edges of the assembled belt. The edge of the belt, therefore, presents only a series of smoothly rounded corners. These cannot tear or catch in the surfaces of adjacent objects; a matter of much mechanical convenience. And persons working near a running belt are in no greater danger than if near an ordinary leather belt. I regard this safety feature as one of distinct importance.

I prefer to form the assembly necks of the link, A, by crushing the wire adjacent to the corner or corners thereof. Obviously, and as specially indicated in Figs. 3, 4, and 5, the crushing operation may be slight or great. The only limitation is that it should not be carried to such a point as to crystallize the metal and thereby weaken the link. On the contrary, one purpose in crushing the wire at these points is to there harden the metal and to displace the metal laterally, as indicated at points 25 in Figs. 3, 4, and 5. The lateral distention of the metal adjacent the corners of the link, plus the hardening or stiffening caused by compression, serves markedly to increase the strength of said corners against forces tending to bend them. This feature is of special importance in the case of links which present the before-mentioned opening, 14, for the reason that the first failure of such a chain always may be expected to result from the opening of the corner bends of the divided pintle, 11, allowing the pintle parts, 13, to spread and escape from the coupler.

In ordinary practice, the crushing of the neck-portion of the link equals substantially one-third of the diameter of the wire stock; i. e., the neck is usually two-thirds the thickness of the remainder of the link.

As depicted, I prefer that the crushing shall form neck-depressions in both sides of the wire, rather than in only a single side thereof. The desirability of this is indicated in Fig. 14, where it will be seen that one depression, 15', accommodates the pintle of the adjacent link; while the other depression, 15", accommodates the crescent end of the coupler, B.

To the end that the general proportions and relative sizes may be better understood, I shall now state generally certain factors that govern the construction and formation of the links, A, and shall state generally the proper dimension-relations of the coupler throat, 21, and the assembly necks, 15.

The minimum width of the throat, 21, of the coupler is fixed by the diameter of the contained pintles, for the coupler must receive those pintles through said throat; and is further fixed by the thickness of the assembly necks of the complementary links. The maximum width of the throat, 21, of the coupler, is fixed by the necessity for preventing the direct upward escape of either of the contained pintles. In practice this maximum allowance is not attempted, for it is desirable that the throat shall be narrow enough to still restrain the pintles after the latter have been considerably worn and reduced in diameter.

The harder the metal of the link, the less may be the depth of the neck-depressions (because of the crystallization limit); but fortunately the harder wire wears less rapidly in service and hence may be used with a coupler having a correspondingly wider throat.

It is apparent that the factors governing the construction of the couplers and the assembly necks of the links are so closely inter-related that considerable variation of the one is feasible, provided there is such compensation in the other as may be necessary or desirable to secure the best results from the standpoints of production, assembly and service.

The construction of the links, A, and of the couplers, B, and the manner of their assembly being now understood, I desire to explain two important points with respect to the couplers which constitute the medium of driving engagement between the sprocket belt and the teeth of sprocket wheel. First, as the couplers are of greater diameter than the pintles of the links, A, it is obvious that any rotation between these parts will take place upon the smaller diameter surfaces; in other words, the pintles will always rotate freely within the seats or journals provided in the couplers. Second, there being this full freedom of rotation between the couplers and the contained pintles of the links, the couplers are left free to act as semi-rollers or rockers against the sprocket teeth, and in consequence much wear is avoided between the teeth and the couplers. In each case the coupler rocks on the tooth, 5, and against the land, 6, as opposed to the sliding action which is characteristic of the single-piece chain.

It is often desirable in machinery having sprocket belts to attach special devices to the belts, such as cross slats; and when this is desired I prefer to remove one of the links, A, and two couplers, B, and to replace the same by a link of special form, as shown in Figs. 17 and 18. This link, 26, may assume different shapes for different purposes, and the one here indicated is merely by way of example. The link, 26, in this instance has an open rectangular body portion, 27, with wing-portions, 28, having holes, 29, for the attachment of the slat, or other special device. While the special link, 26, may be of a construction adapted to be joined by means of my couplers, I prefer that it shall have two pintle-containing hooks, 29', and shall thereby directly connect the pintles of the adjacent links, A. In such cases I preserve in these hooks the standard pitch depth of the couplers, B, and the over-all length (center to center) of a combined link, A, and coupler, B.

There are many other advantages inherent in my chain which it is not thought necessary to detail, since they are attainable by making a chain in the manner here described and in the general proportions and shapes shown in the drawings.

Having thus described my invention, I claim as new and desire to secure by Letters Patent:—

1. A new article of manufacture comprising a detachable link belt or chain adapted for use on sprockets designed for single-piece-link belts or chains, and composed of parts or links of only two forms, both made of wire; each of the first being substantially rectangular, presenting straight, but cross-sectionally round pintle portions, and rounded corners, and having a thin assembly neck at at least one corner, and the links of the second form being semi-roller or rocker elements; crescent-like in shape, of a depth corresponding to the pitch depth of the complementary sprocket wheel, and in each case pivotally containing two pintles of adjacent links in intimate but non-contacting relation and thus serving as a coupler for said links, and the links of the two forms being assembled by co-action of the assembly necks of the first links and the crescent ends of the second links, and said second links or couplers having, after assembly, only a limited longitudinal play upon respective coupled pintles, being restrained by the rounded corner portions of the connected links.

2. A new article of manufacture comprising a detachable link belt or chain adapted for use on sprockets designed for single-piece-link belts or chains, and composed of parts or links of only two forms; each of the first, made of cross-sectionally round wire, being substantially rectangular, presenting straight, but cross-sectionally round, pintle portions, and rounded corners, and having a thin assembly neck at at least one corner, and the links of the second form being semi-roller or rocker elements, crescent-like in shape, containing a single pintle slot, of a depth corresponding to the pitch depth of the complementary sprocket wheel, and in each case pivotally containing two pintles of adjacent first links in intimate but non-contacting relation and thus serving as a coupler for said links, and the links of the two forms being assembled by co-action of the assembly necks of the first links and the crescent ends of the second links, and said second links or couplers having, after assembly, only a limited longitudinal play upon respective coupled pintles, being restrained by the rounded corner portions of the first form links.

3. A new article of manufacture comprising a detachable link belt or chain adapted for use on sprockets designed for single-piece-link belts or chains, and composed of parts or links of only two forms, both made of wire; the first links being substantially rectangular, presenting straight, but cross-sectionally round, pintle portions and thin assembly necks, and the links of the second form being semi-roller or rocker elements, crescent-like in shape, of a depth corresponding to the pitch depth of the complementary sprocket wheel, and in each case pivotally containing two pintles of adjacent links in intimate but non-contacting relation and thus serving as a coupler for said first links, and the links of the two forms being assembled by co-action of the assembly necks of the first links and the crescent ends of the second links.

4. A new article of manufacture comprising a link belt or chain for use on standard sprockets designed for single-piece-link belts or chains, and composed of parts or links of only two forms, both made of wire; the first links being substantially rectangular, presenting straight, but cross-sectionally round, pintle portions, and rounded corners, and the links of the second form being semi-roller or rocker elements, crescent-like in shape, of a depth corresponding to the pitch depth of the complementary sprocket wheel, and in each case pivotally containing two pintles of adjacent links in intimate but non-contacting relation and thus serving as a coupler for said links.

In testimony whereof, I have hereunto set my hand this 4th day of December, 1917.

WALTER E. AMBERG.

Copies of this patent may be obtained for five cents each, by addressing the "Commissioner of Patents, Washington, D. C."